United States Patent
Okumura et al.

(10) Patent No.: US 7,785,729 B2
(45) Date of Patent: Aug. 31, 2010

(54) BATTERY PACK AND BATTERY PACK PRODUCING METHOD

(75) Inventors: Motoyoshi Okumura, Chiryu (JP); Katsunori Maegawa, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 110 days.

(21) Appl. No.: 12/216,204

(22) Filed: Jul. 1, 2008

(65) Prior Publication Data
US 2009/0011327 A1    Jan. 8, 2009

(30) Foreign Application Priority Data
Jul. 4, 2007   (JP) .............................. 2007-176145

(51) Int. Cl.
*H01M 10/42* (2006.01)
*H01M 10/44* (2006.01)
*H01M 2/10* (2006.01)
*H02J 7/00* (2006.01)

(52) U.S. Cl. .............................. 429/49; 429/52; 429/99; 429/156; 29/623.1; 320/112; 320/137

(58) Field of Classification Search ................... 429/99, 429/49, 52; 29/623.1; 396/6; 320/122, 103, 320/137, 112
See application file for complete search history.

(56) References Cited

U.S. PATENT DOCUMENTS

| 3,215,241 | A  | * | 11/1965 | Haefele et al. ............... 194/240 |
| 6,381,409 | B1 | * | 4/2002 | Aoshima et al. ............... 396/6 |
| 2001/0035737 | A1 | * | 11/2001 | Nakanishi et al. ........... 320/122 |
| 2003/0008201 | A1 | * | 1/2003 | Komori et al. ................. 429/49 |
| 2003/0224241 | A1 | * | 12/2003 | Takada et al. .................. 429/52 |

FOREIGN PATENT DOCUMENTS

JP    A-2004-185915    7/2004

* cited by examiner

*Primary Examiner*—Jonathan Crepeau
*Assistant Examiner*—Kenneth Douyette
(74) *Attorney, Agent, or Firm*—Oliff & Berridge, PLC

(57) ABSTRACT

A battery pack capable of sufficiently exhibiting performance of each secondary battery constituting the battery pack and its producing method are provided. The battery pack producing method of the invention comprises an obtaining process for obtaining a charge amount–voltage curve C during charging and a charge amount–voltage curve D during discharging, a selecting process for selecting more than one of the used secondary batteries close to each other in curves C and D from a group of the used secondary batteries whose curves C and D have been obtained, and an assembling process for combining the selected used secondary batteries to constitute the battery pack.

4 Claims, 10 Drawing Sheets

ESTIMATED SOC 10%

BATTERY PACK AND BATTERY PACK PRODUCING METHOD

BACKGROUND OF THE INVENTION

1. Field of the Invention

The present invention relates to a battery pack and a battery pack producing method.

2. Description of Related Art

Recently, various secondary batteries have been proposed as the power source for portable devices and mobile devices or as the power source for electric vehicles or hybrid electric vehicles. When the secondary batteries are used as the power source for electric vehicles or hybrid electric vehicles, high output power is demanded and hence a plurality of secondary batteries are electrically connected in series to be used as a battery pack.

However, in the battery pack used as the power source for electric vehicles or hybrid electric vehicles, one or more of the secondary batteries constituting the battery pack are often broken earlier than other batteries due to environments of use, characteristic difference among individual secondary batteries of the battery pack, or troubles of component parts of each secondary battery. As a result, the intended performance of the battery pack may not be exhibited, which may cause the entire system failure. To solve such problems, a secondary battery broken earlier than other batteries must be replaced with a normal secondary battery. Various methods have been proposed for replacing the secondary batteries (see, for example, JP2004-185915A).

JP2004-185915A discloses a method of replacing secondary batteries of a battery pack in which a plurality of secondary batteries are electrically connected in series or in parallel. According to this method, when a certain defective secondary battery is to be replaced with a new secondary battery for exchange, a charge amount of the new secondary battery is controlled to be smaller than charge amounts of other batteries not to be replaced (normal secondary batteries of the battery pack). Specifically, the new secondary battery is charged so that the charge amount thereof may be 5% to 20% smaller than the charge amounts of other normal batteries not to be replaced. As a result, according to JP'915A, when charging and discharging are repeated during use of the battery pack, the difference in charge amount (the charged electric quantity) between the new secondary battery and other existing batteries becomes smaller, and hence the charge amounts of secondary batteries of the battery pack become equal. It is also said that the performance of the battery pack can be exhibited to a maximum extent.

Even when electric vehicles or hybrid electric vehicles are to be deregistered or scrapped, the battery packs mounted thereon may still be in a usable state. Further, even in the case where the battery pack is replaced with a new battery pack due to defective one(s) of the secondary batteries of the battery pack, the other secondary batteries in the discarded battery pack may still be in a usable state. A new technique is therefore demanded for re-using the usable secondary batteries without discarding, that is, usable secondary batteries among secondary batteries used and collected from the market (hereinafter, also referred to as "used secondary battery(s)"). For example, there is demand for a technique of producing a new battery pack by collecting used battery packs from scrapped vehicles or the like and combining usable secondary batteries (used secondary batteries) contained in those collected used battery packs.

However, the collected used secondary batteries contain those used in various environments and thus battery characteristics are often largely different from battery to battery. Such difference in battery characteristics may cause some problems when a battery pack is produced by combining the used secondary batteries. For example, one or more of the used secondary batteries constituting the battery pack may be overcharged or overdischarged and the performance of the used secondary batteries of the battery pack may not be exhibited sufficiently. JP'915A and others disclose various techniques for replacing one or more of secondary batteries constituting the battery pack (defective secondary batteries) with new and normal secondary batteries. However, such techniques could not be applied in the technique of producing a new battery pack by combining used secondary batteries.

SUMMARY OF THE INVENTION

The present invention has been made in view of the above circumstances and has an object to provide a battery pack capable of sufficiently exhibiting the performance of used secondary batteries constituting the battery pack and a producing method of the battery pack.

To achieve the above object, the invention provides a battery pack producing method comprising: an obtaining process for obtaining, about each of secondary batteries having ever been used, a charge amount-voltage curve during charging representing a relationship between a charge amount (a charged electric quantity, the same applies to the following) and battery voltage when each used secondary battery is charged under a predetermined charge condition and a charge amount-voltage curve during discharging representing a relationship between a charge amount and battery voltage when each used secondary battery is discharged under a predetermined discharge condition; a selecting process for selecting more than one of the used secondary batteries having the charge amount-voltage curves during charging similar to each other and the charge amount-voltage curves during discharging similar to each other from a group of the used secondary batteries whose charge amount-voltage curves during charging and charge amount-voltage curves during discharging have been obtained; and an assembling process for combining and assembling the selected used secondary batteries into a new battery pack.

Alternatively, the invention provides a battery pack producing method comprising: an obtaining process for obtaining, about each of secondary batteries having ever been used, voltage corresponding to a predetermined charge amount during charging which is a battery voltage corresponding to each of a plurality of predetermined charge amounts of each used secondary battery when charged under a predetermined charge condition and voltage corresponding to a predetermined charge amount during discharging which is a battery voltage corresponding to each of a plurality of predetermined charge amounts of each used secondary battery when discharged under a predetermined discharge condition; a selecting process for selecting more than one of the used secondary batteries having the voltages corresponding to a predetermined charge amount during charging similar to each other and the voltages corresponding to a predetermined charge amount during discharging similar to each other from a group of the used secondary batteries whose voltages corresponding to a predetermined charge amount during charging and voltages corresponding to a predetermined charge amount during discharging have been obtained; and an assembling process for combining and assembling the selected used secondary batteries into a new battery pack.

Various using methods are available to use the battery pack. For instance, there is a method achieved by detecting battery voltage of each secondary battery constituting the battery pack by a control means (a battery controller, an ECU, etc.) and, based on a detection result, finely controlling a charged state of the battery pack for use.

In the case where the battery pack is used while its charged state is controlled by the control means for controlling the charged state of the battery pack to fine detail as above, the battery pack may not be used appropriately if a charge amount-voltage curve during charging and a charge amount-voltage curve during discharging (or voltage corresponding to a predetermined charge amount during charging or voltage corresponding to a predetermined charge amount during discharging) are widely different between the used secondary batteries constituting the battery pack.

For instance, even when the used secondary batteries are equal in charge amount, they may widely differ in battery voltage. In this case, the control means is liable to determine that a battery voltage difference exceeds a normal range and thus detect an abnormality in battery voltage or an abnormality in an estimated SOC estimated based on the battery voltage. Even when the battery voltage difference is within the normal range, due to the battery voltage difference (or the estimated SOC difference) between the used second batteries, an available electric quantity (power) may be limited to that of the secondary battery with low battery voltage (or estimated SOC). Each used secondary battery could not exhibit sufficient performance.

On the other hand, the producing method of the invention is achieved by obtaining the charge amount-voltage curve during charging and the charge amount-voltage curve during discharging of each used secondary battery (or the voltage corresponding to a predetermined charge amount during charging and the voltage corresponding to a predetermined charge amount during discharging), selecting more than one of the used secondary batteries from a group of the used secondary batteries subjected to the obtaining process, the selected used secondary batteries having similar charge amount-voltage curves during charging and similar charge amount-voltage curves during discharging (or similar voltages corresponding to a predetermined charge amount during charging and similar voltages corresponding to a predetermined charge amount during discharging), and combining and assembling the selected used secondary batteries into the battery pack. In this manner, the used secondary batteries that are close or similar to each other in charge amount-voltage curve during charging and in charge amount-voltage curve during discharging (or close or similar to each other in voltage corresponding to a predetermined charge amount during charging and in voltage corresponding to a predetermined charge amount during discharging) are combined, so that the battery voltage difference between the used secondary batteries can be reduced during use of the battery pack. This is because the used secondary batteries that are similar to each other in charge amount-voltage curve during charging and in charge amount-voltage curve during discharging (or similar to each other in voltage corresponding to a predetermined charge amount during charging and in voltage corresponding to a predetermined charge amount during discharging) exhibit similar battery voltage behaviors to each other during use (during charging and during discharging).

Even if the battery pack is used while its charged state is controlled by the control means for controlling the charged state of the battery pack to fine detail as above, it is possible to restrain the control means from detecting an abnormality in battery voltage or detecting an abnormality in estimated SOC estimated based on the battery voltage. Accordingly, the relevant battery pack can be used appropriately. It is further possible to prevent an available electric quantity of the battery pack from being limited by the used secondary battery with low battery voltage (or estimated SOC). Thus, each used secondary battery constituting the battery pack can exhibit sufficient performance. It is needless to say that each used secondary battery constituting the battery pack can achieve sufficient performance even when the battery pack is used under simpler control than above or is used without control of a charged state.

According to the producing method of the invention, as described above, the battery pack can be produced capable of sufficiently exhibiting performance of each used secondary battery constituting the battery pack.

The charge amount-voltage curve during charging and the charge amount-voltage curve during discharging (or the voltage corresponding to a predetermined charge amount during charging and the voltage corresponding to a predetermined charge amount during discharging) can be obtained for example by a predetermined well known technique achieved by detecting battery voltage corresponding to a charge amount during charging under a predetermined charge condition and during discharging under a predetermined discharge condition in measurement of a full charge capacity of each used secondary battery.

The obtaining process may include obtaining the charge amount-voltage curve during charging and the charge amount-voltage curve during discharging (or the voltage corresponding to a predetermined charge amount during charging and the voltage corresponding to a predetermined charge amount during discharging) by actual measurement. Further, this process may be achieved by getting used secondary batteries whose charge amount-voltage curves during charging and charge amount-voltage curves during discharging (or voltages corresponding to a predetermined charge amount during charging and voltages corresponding to a predetermined charge amount during discharging) have been obtained, and knowing each charge amount-voltage curve during charging and charge amount-voltage curve during discharging (or voltage corresponding to a predetermined charge amount during charging and voltage corresponding to a predetermined charge amount during discharging).

Further, in the aforementioned battery pack producing method, preferably, the selecting process includes selecting more than one of the used secondary batteries having the charge amount-voltage curves during charging similarly different from a charge amount-voltage reference curve during charging of a reference secondary battery representing a relationship between a charge amount and battery voltage when the reference secondary battery is charged under the predetermined charge condition and having the charge amount-voltage curves during discharging similarly different from a charge amount-voltage reference curve during discharging of the reference secondary battery presenting a relationship between a charge amount and battery voltage when the reference secondary battery is discharged under the predetermined discharge condition.

In the aforementioned battery pack producing method, preferably, the selecting process includes selecting more than one of the secondary batteries having the voltages corresponding to a predetermined charge amount during charging similarly different from a reference voltage corresponding to a predetermined charge amount during charging of a reference secondary battery when charged under the predetermined charge condition and having the voltages corresponding to a predetermined charge amount during discharging similarly different from the reference voltage corresponding to a predetermined charge amount during discharging of the reference secondary battery when discharged under the predetermined discharge condition.

In the producing method of the invention, for instance, as a comparative reference, the charge amount-voltage curve during charging and charge amount-voltage curve during discharging (or voltage corresponding to a predetermined charge amount during charging and voltage corresponding to a predetermined charge amount during discharging) of the reference secondary battery is obtained in advance. A difference between this comparative reference and the charge amount-voltage curve during charging of each used secondary battery or the like is obtained. In the selecting process, subsequently, the used secondary batteries are selected so that the differences from the comparative reference are similar to each other.

The reference secondary battery may include for example a secondary battery (an initial reference secondary battery) having characteristics corresponding to a new secondary battery or an initial use stage, a used secondary battery having characteristics corresponding to a secondary battery having ever been used for a predetermined time under a typical use environment, and others.

The difference between the charge amount-voltage curve of each used secondary battery and others and the charge amount-voltage curve of the reference secondary battery can be represented as a battery voltage difference obtained for instance by comparison of their battery voltages at the same charge amount (Ah).

In the aforementioned battery pack producing method, preferably, the reference secondary battery is an initial reference secondary battery that exhibits characteristics corresponding to a new secondary battery or an initial use stage, the selecting process includes selecting the used secondary batteries under condition that when each of the used secondary batteries is defined such that: of battery voltage differences during charging obtained by comparison in battery voltage at the same charge amount between the charge amount-voltage curve during charging and the charge amount-voltage reference curve during charging, a largest one is a maximum battery voltage difference during charging and a charge amount corresponding to the maximum battery voltage difference during charging is a maximum-difference charge amount during charging; and, of battery voltage differences during discharging obtained by comparison in battery voltage at the same charge amount between the charge amount-voltage curve during discharging and the charge amount-voltage reference curve during discharging, a largest one is a maximum battery voltage difference during discharging and a charge amount corresponding to the maximum battery voltage difference during discharging is a maximum-difference charge amount during discharging, a difference between a largest one and a smallest one of the maximum-difference charge amounts during charging of the selected used secondary batteries falls within 10% of a full charge capacity of the initial reference battery, and a difference between a largest one and a smallest one of the maximum-difference charge amounts during discharging of the selected used secondary batteries falls within 10% of a full charge capacity of the initial reference battery.

Further, in the aforementioned battery pack producing method, preferably, the reference secondary battery is an initial reference secondary battery exhibiting characteristics corresponding to a new secondary battery or an initial use stage, the selecting process includes selecting the used secondary batteries under condition that when each of the used secondary batteries is defined such that: of battery voltage differences during charging obtained by comparison between each voltage corresponding to a predetermined charge amount during charging and the reference voltage corresponding to a predetermined charge amount during charging at the same predetermined charge amount, a largest one is a maximum battery voltage difference during charging and a charge amount corresponding to the maximum battery voltage difference during charging is a maximum-difference charge amount during charging; and, of battery voltage differences during discharging obtained by comparison between each voltage corresponding to a predetermined charge amount during discharging and the reference voltage corresponding to a predetermined charge amount during discharging at the same predetermined charge amount, a largest one is a maximum battery voltage difference during discharging and a charge amount corresponding to the maximum battery voltage difference during discharging is a maximum-difference charge amount during discharging, a difference in maximum-difference charge amount during charging between a largest one and a smallest one of the maximum-difference charge amounts during charging of the selected used secondary batteries falls within 10% of a full charge capacity of the initial reference battery, and a difference in maximum-difference charge amount during discharging between a largest one and a smallest one of the maximum-difference charge amounts during discharging of the selected used secondary batteries falls within 10% of a full charge capacity of the initial reference battery.

In any one of the aforementioned battery pack producing methods, preferably, the selecting process includes selecting the used secondary batteries so that a difference in maximum battery voltage difference during charging between a largest one and a smallest one of the maximum battery voltage differences during charging of the used secondary batteries falls within 50% of the largest maximum battery voltage difference during charging, and a difference in maximum battery voltage difference during discharging between a largest one and a smallest one of the maximum battery voltage differences during discharging of the used secondary batteries falls within 50% of the largest maximum battery voltage difference during discharging.

According to another aspect, the present invention provides a battery pack including secondary batteries that have ever been used and are newly combined, wherein when each of the used secondary batteries is defined such that: between a charge amount-voltage curve during charging representing a relationship between a charge amount and battery voltage when each battery is charged under a predetermined charge condition and a charge amount-voltage reference curve during charging representing a relationship between charge amount and battery voltage when an initial reference secondary battery having characteristics corresponding to a new secondary battery or an initial use stage is charged under the predetermined charge condition, of battery voltage differences during charging obtained by comparison between the battery voltages at the same charge amount, a largest one is a maximum battery voltage difference during charging and a charge amount corresponding to the maximum battery voltage difference during charging is a maximum-difference charge amount during charging; and, between a charge amount-voltage curve during discharging representing a relationship between a charge amount and battery voltage when each battery is discharged under a predetermined discharge condition and a charge amount-voltage reference curve during discharging representing a relationship between a charge amount and battery voltage when the initial reference secondary battery is discharged under the predetermined discharge condition, of battery voltage differences during discharging obtained by comparison between the battery voltages at the same charge amount, a largest one is a maximum battery voltage difference during discharging and a charge amount corresponding to the maximum battery voltage difference during discharging is a maximum-difference charge amount during discharging, a difference in maximum-difference charge amount during charging between a largest one and a smallest one of the maximum-difference charge amounts during charging of the selected used secondary batteries falls within 10% of a full charge capacity of the initial reference battery, and a difference in maximum-difference charge amount during discharging between a largest one and a smallest one of the maximum-difference charge amounts during discharging of the selected used secondary batteries falls within 10% of a full charge capacity of the initial reference battery.

Alternatively, the present invention provides a battery pack including secondary batteries that have ever been used and are newly combined, wherein when each of the used secondary batteries is defined such that: between voltage corresponding to a predetermined charge amount during charging which is a battery voltage corresponding to each of predetermined charge amounts of each used secondary battery when charged under a predetermined charge condition and a reference voltage corresponding to a predetermined charge amount during charging which is a battery voltage corresponding to a predetermined charge amount of an initial reference secondary battery having characteristics corresponding to a new secondary battery or an initial use stage when it is charged under the predetermined charge condition, of battery voltage differences during charging obtained by comparison between the battery voltages at the same charge amount, a largest one is a maximum battery voltage difference during charging and a charge amount corresponding to the maximum battery voltage difference during charging is a maximum-difference charge amount during charging; and between voltage corresponding to a predetermined charge amount during discharging which is a battery voltage corresponding to each of predetermined charge amounts of each used secondary battery when discharged under a predetermined discharge condition and a reference voltage corresponding to a predetermined charge amount during discharging which is a battery voltage corresponding to each predetermined charge amount of the initial reference secondary battery when discharged under the predetermined charge condition, of battery voltage differences during discharging obtained by comparison between the battery voltages at the same charge amount, a largest one is a maximum battery voltage difference during discharging and a charge amount corresponding to the maximum battery voltage difference during discharging is a maximum-difference charge amount during discharging; a difference in maximum-difference charge amount during charging between a largest one and a smallest one of the maximum-difference charge amounts during charging of the selected used secondary batteries falls within 10% of a full charge capacity of the initial reference battery, and a difference in maximum-difference charge amount during discharging between a largest one and a smallest one of the maximum-difference charge amounts during discharging of the selected used secondary batteries falls within 10% of a full charge capacity of the initial reference battery.

The battery pack of the present invention meets the following two conditions.

(1) Of the used secondary batteries constituting the battery pack, a difference in charge amount QC for maximum voltage difference (also referred to as a maximum-difference charge amount QC) during charging between the used secondary battery with a largest QC and the used secondary battery with a smallest QC falls within 10% of the full charge capacity of the initial reference secondary battery.

(2) Of the selected used secondary batteries, a difference in charge amount QD for maximum voltage difference (also referred to as a maximum-difference charge amount QD) during discharging between the used secondary battery with a largest QD and the used secondary battery with a smallest QD falls within 10% of the full charge capacity of the initial reference secondary battery.

In the battery pack constituted by the used secondary batteries with a small difference in QC and a small difference in QD, the secondary batteries of the battery pack are similar to each other in battery voltage behavior during use (during charging and during discharging). Therefore, the battery voltage difference between the secondary batteries during use of the concerned battery pack can be reduced appropriately. Accordingly, each used secondary battery constituting the battery pack can sufficiently exhibit the performance.

In any one of the aforementioned battery pack producing methods, preferably, of the used secondary batteries constituting the battery pack, a difference in maximum battery voltage difference during charging between a largest one and a smallest one of the maximum battery voltage differences during charging falls within 50% of the largest maximum battery voltage difference during charging, and a difference in maximum battery voltage difference during discharging between a largest one and a smallest one of the maximum battery voltage differences during discharging falls within 50% of the largest maximum battery voltage difference during discharging.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Embodiment 1

A detailed description of a first preferred embodiment of the present invention will now be given referring to the accompanying drawings.

Figure 1:
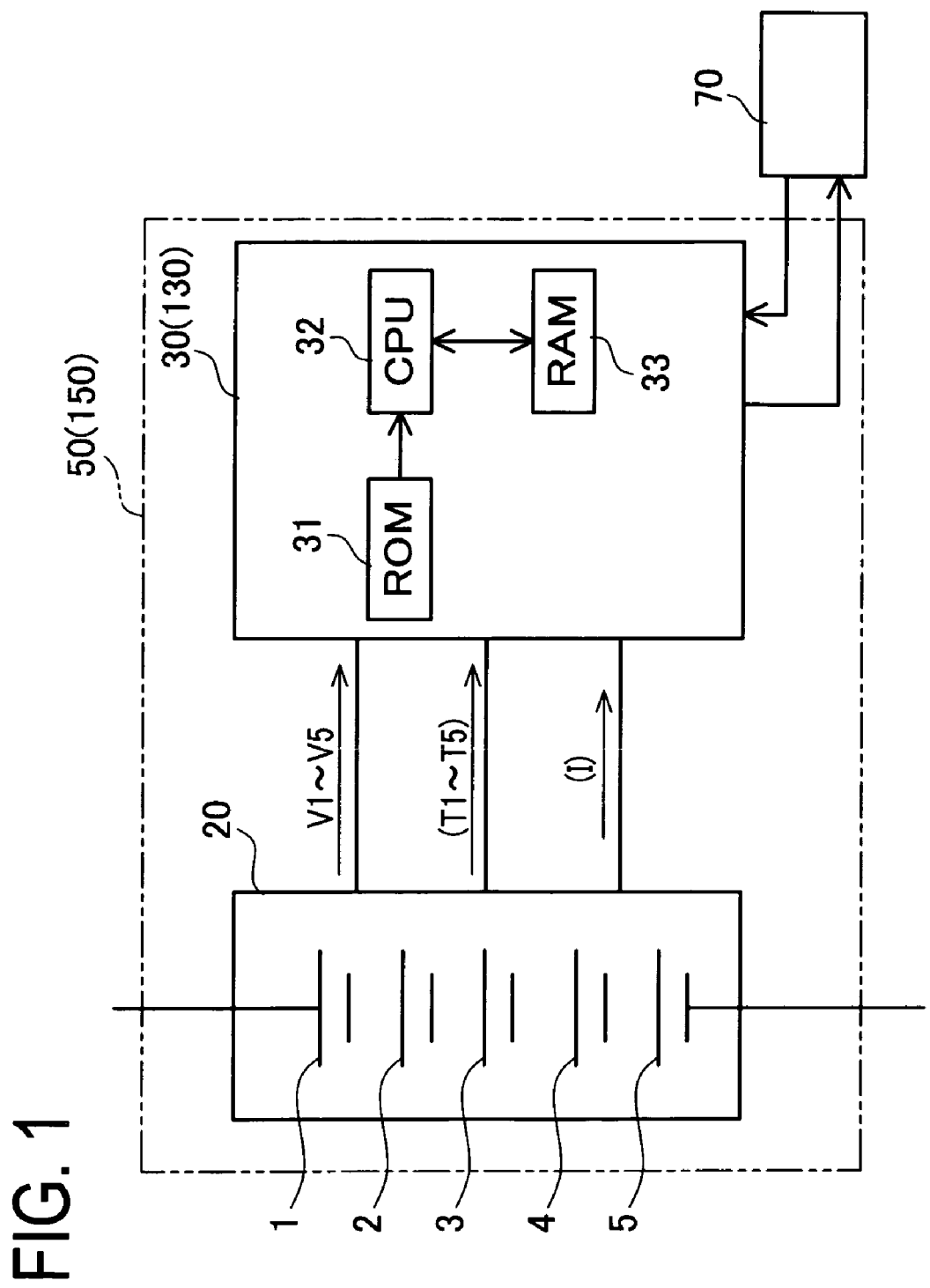
FIG. 1 is a block diagram of a battery pack with controller in first and second embodiments.
Figure 2:
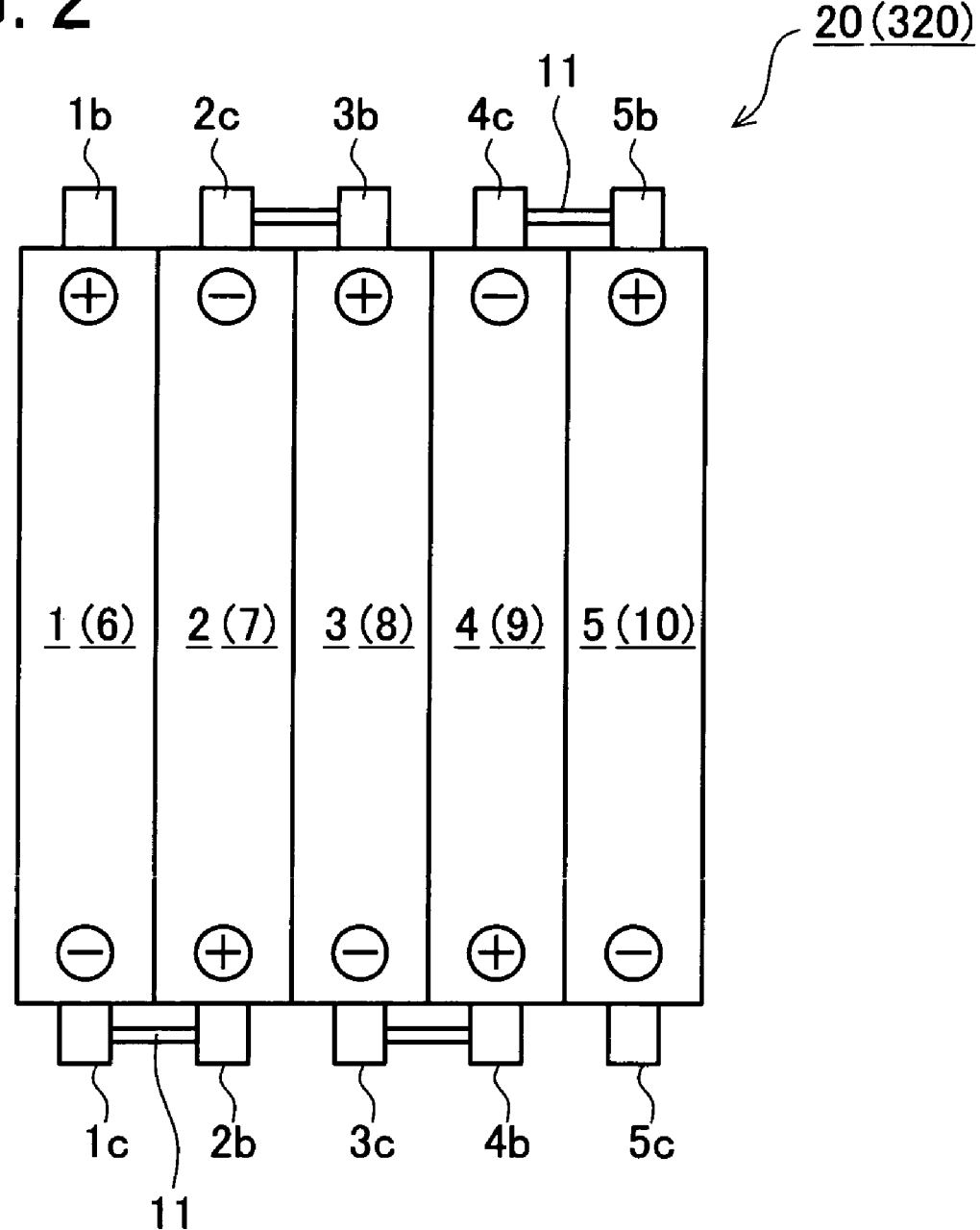
FIG. 2 is a top view of the battery pack in the first and second embodiments.

A battery pack 50 equipped with a controller (hereinafter, "controller-equipped battery pack 50") in this embodiment is first explained. The controller-equipped battery pack 50 includes, as shown in FIG. 1, a battery pack 20 and a battery controller 30. As shown in FIG. 2, the battery pack 20 includes five used secondary batteries (used secondary batteries 1 to 5) arranged in a row and electrically connected in series by way of connection members 11.

The battery controller 30 is a known battery controller (see, for example, JP2006-79961A), and includes a ROM 31, a CPU 32, a RAM 33, and others. As shown in FIG. 1, the battery controller 30 is configured to detect battery voltages V1 to V5 of used secondary batteries 1 to 5 constituting the battery pack 20. In the case where, of the battery voltages V1 to V5, a largest difference between a lowest battery voltage and a highest battery voltage exceeds a permissible range (e.g. 0.1V), the battery voltage is determined to be abnormal and charging/discharging of the battery pack 20 is forcibly stopped.

The controller-equipped battery pack 50 will be mounted on for example an electric vehicle or a hybrid electric vehicle and used as a power source thereof.

Figure 3:
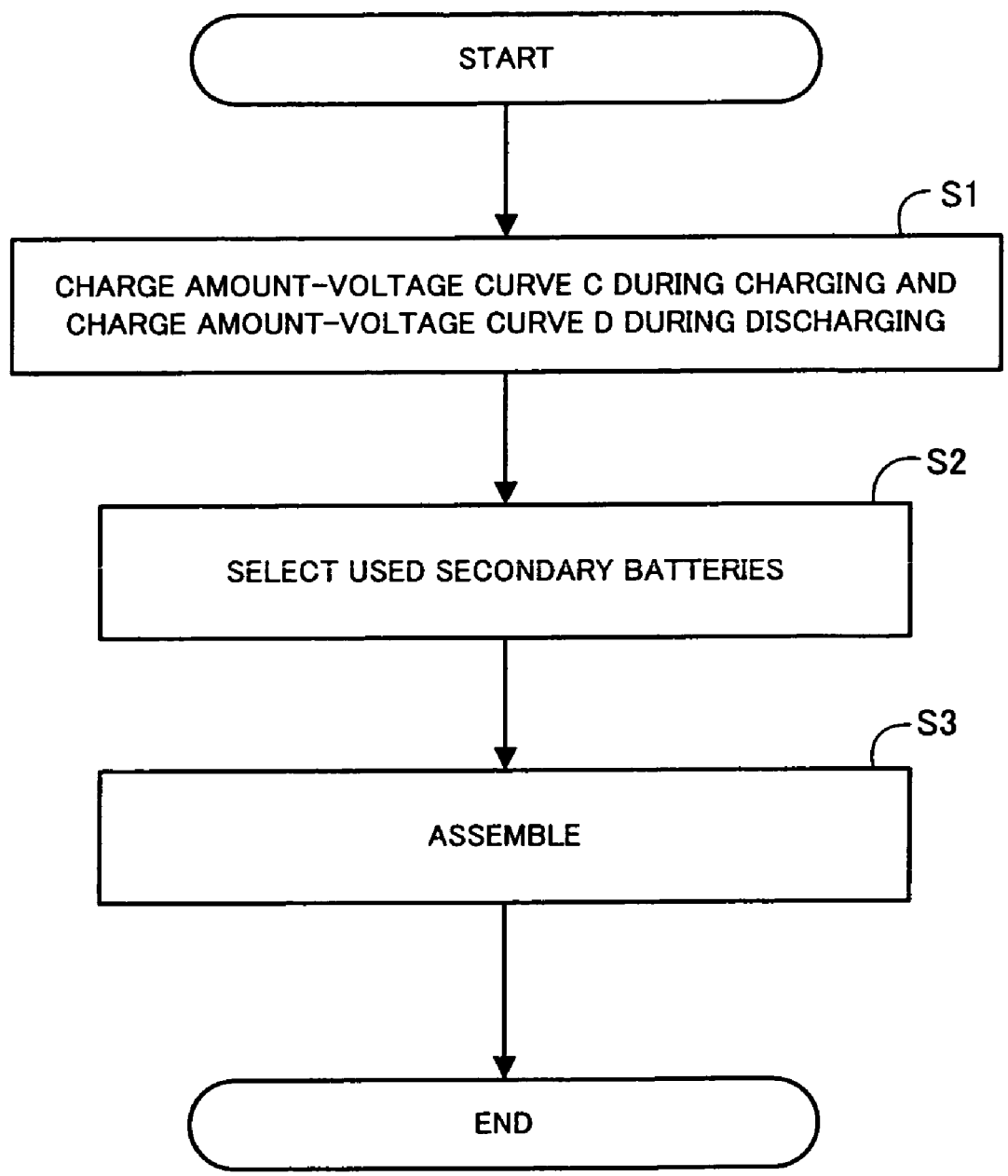
FIG. 3 is a flowchart showing the flow of a process of producing the battery pack in the first and second embodiments.

A producing method of the battery pack 20 in the first embodiment is described below. FIG. 3 is a flowchart showing the flow of the producing process of the battery pack 20 in the first embodiment.

(Obtaining Process)

As shown in FIG. 3, at step S1, a charge amount-voltage curve C during charging and a charge amount-voltage curve D during discharging (see FIG. 4) of each of the used secondary batteries 1 to 10 (herein, also referred to as simply "batteries") collected from the market are obtained. Specifically, each battery 1 to 10 was charged from a fully discharged state to a fully charged state (a charge amount: 6.5 Ah, in the first embodiment). For instance, under the constant temperature of 25° C., each battery 1 to 10 was discharged at a current value of 0.3 C until the battery voltage became 1.0 V. After letting stand for 3 minutes, each battery 1 to 10 was charged at a constant current value of 0.35 C for 3.2 hours. At charging, the battery voltage (V) of each battery 1 to 10 was measured every 0.1 Ah to obtain a voltage corresponding to a predetermined charge amount during charging. Each voltage value corresponding to a predetermined charge amount during charging was plotted to obtain a charge amount-voltage curve C during charging (hereinafter, also simply referred to as a "curve C")

Further, each battery 1 to 10 was discharged from the fully charged state to the fully discharged state. For instance, each battery 1 to 10 was charged to the fully charged state as above and let stand for 3 minutes and then discharged at a constant current value of 0.3 C until the battery voltage became 1.0 V. During this discharging process, the battery voltage (V) was measured every 0.1 Ah to obtain a voltage corresponding to a predetermined charge amount during discharging. Each voltage value corresponding to a predetermined charge amount during discharging time was plotted to obtain a charge amount-voltage curve D during discharging (hereinafter, also simply referred to as a "curve D"

Figure 4:
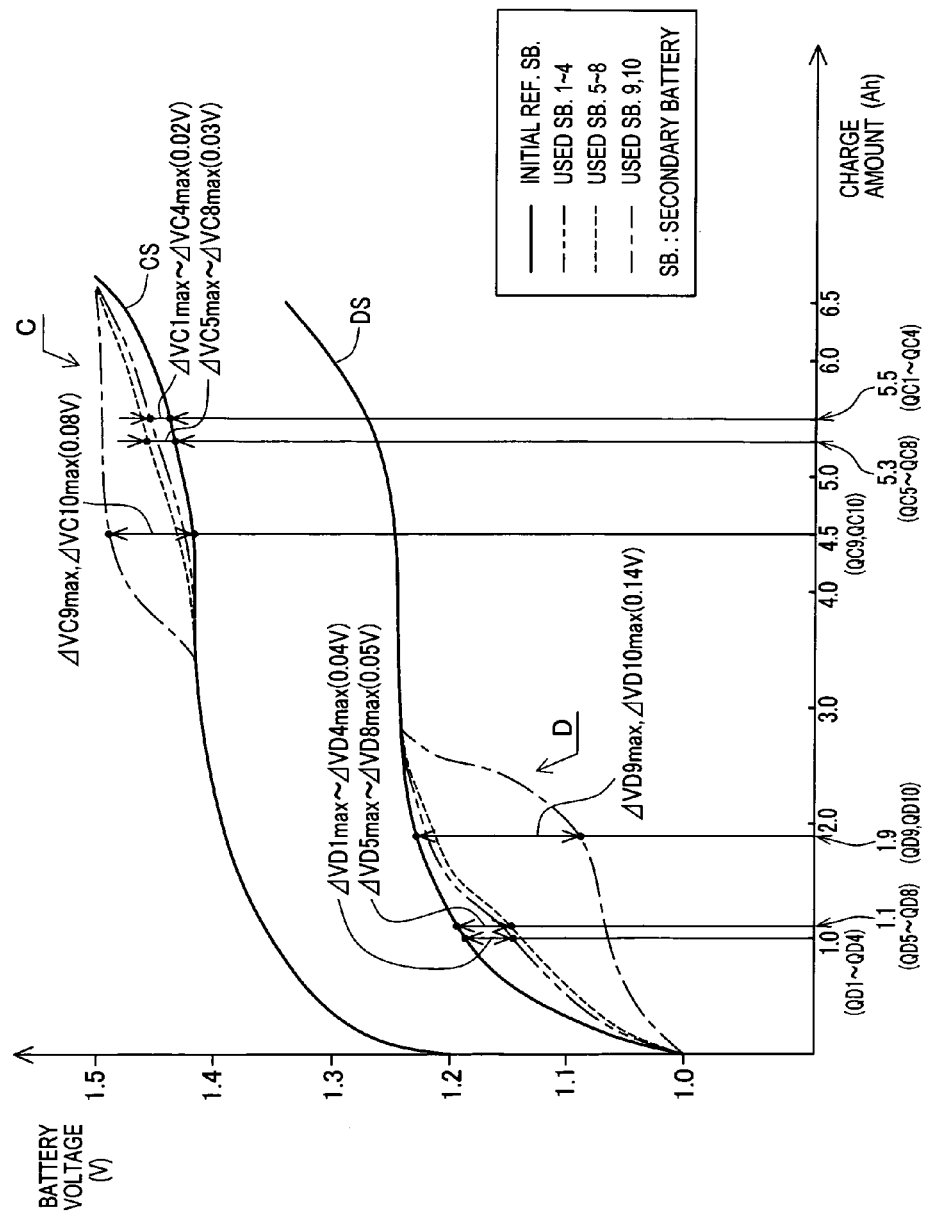
FIG. 4 is a graph showing a charge amount-voltage curve during charging and a charge amount-voltage curve during discharging of the used secondary batteries.

In this embodiment, 1 C is a current value (for example, 6.5 A) capable of completely discharging, in 1 hour, the charge amount (for example, 6.5 Ah) satisfying the full charge capacity of each used secondary battery 1 to 10. Thus, the charge amount-voltage curve C during charging and the charge amount-voltage curve D during discharging can be obtained. Those curves C and D are shown in FIG. 4. Further, regarding an initial reference secondary battery having the characteristics corresponding to a new secondary battery, a voltage corresponding to a predetermined charge amount during charging and a voltage corresponding to a predetermined charge amount during discharging were obtained in the same manner as above to the batteries 1 to 10. Based on those voltages, a charge amount-voltage reference curve CS during charging (hereinafter, also simply referred to as a "reference curve CS") and a charge amount-voltage reference curve DS during discharging (hereinafter, also simply referred to as a "reference curve DS") are plotted by solid lines in FIG. 4.

In the first embodiment, the charge amount-voltage curve C during charging and the charge amount-voltage curve D during discharging are nearly equal between the batteries 1 to 4. Therefore, the curves C and D of each battery 1 to 4 are plotted by common chain double-dashed lines in FIG. 4. Further the charge amount-voltage curve C during charging and the charge amount-voltage curve D during discharging are nearly equal between the batteries 5 to 8 and hence the curves C and D of each battery 5 to 8 are also plotted by common broken lines in FIG. 4. Similarly, the charge amount-voltage curve C during charging and charge amount-voltage curve D during discharging are nearly equal between the batteries 9 and 10 and hence the curves C and D of each battery 9 and 10 is plotted by common dashed lines in FIG. 4. This step S1 in the first embodiment corresponds to an obtaining process.

Next, the used secondary battery 1 was compared with the initial reference secondary battery by comparing battery voltages at the same charge amount every 0.1 Ah in a range of 0 Ah to 6.5 Ah between the curve C and the reference curve CS to obtain battery voltage differences $\Delta VC1$ during charging. Specifically, battery voltages at the same charge amount were compared every 0.1 Ah in a range of 0 Ah to 6.5 Ah between a voltage corresponding to a predetermined charge amount during charging of the battery 1 and a voltage corresponding to a predetermined charge amount during charging of the initial reference secondary battery to obtain battery voltage differences $\Delta VC1$ during charging.

A largest one of the differences is defined as a maximum battery voltage difference $\Delta VC1_{max}$ during charging, and a charge amount corresponding to this $\Delta VC1_{max}$ is defined as a charge amount QC1 for maximum voltage difference (also referred to as a maximum-difference charge amount QC1) during charging (see FIG. 4). $\Delta VC1_{max}$ was about 0.02V and QC1 was 5.5 Ah. Regarding the batteries 2 to 10, respective maximum battery voltage differences $\Delta VC2_{max}$ to $\Delta VC10_{max}$ and maximum-difference charge amounts QC2 to QC10 were obtained in the same manner as above for the battery 1.

Each of the maximum battery voltage differences $\Delta VC2_{max}$ to $\Delta VC10_{max}$ of the batteries 2 to 4 was about 0.02V as with $\Delta VC1_{max}$ (see FIG. 4). Each of the maximum-difference charge amounts QC2 to QC4 was 5.5 Ah as with QC1.

Each of the maximum battery voltage differences $\Delta VC5_{max}$ to $\Delta VC8_{max}$ of the batteries 5 to 8 was about 0.03V. Each of the maximum-difference charge amounts QC5 to QC8 was 5.3 Ah.

Each of the maximum battery voltage differences $\Delta VC9_{max}$ and $\Delta VC10_{max}$ of the batteries 9 and 10 was about 0.08V. Each of the maximum-difference charge amounts QC9 and QC10 was 4.5 Ah.

Furthermore, each of the used secondary batteries 1 to 10 was compared with the initial reference secondary battery by comparing battery voltages at the same charge amount every 0.1 Ah in a range of 0 Ah to 6 Ah between the curve D and the reference curve DS to obtain battery voltage differences $\Delta VD1$ to $\Delta VD10$ during discharging. Largest ones of the differences are defined as maximum battery voltage differences $\Delta VD1_{max}$ to $\Delta VD10_{max}$ during discharging, and charge amounts corresponding to these $\Delta VD1_{max}$ to $\Delta VD10_{max}$ are defined as maximum-difference charge amounts QD1 to QD10 during discharging (see FIG. 4).

Specifically, each of $\Delta VD1_{max}$ to $\Delta VD4_{max}$ was about 0.04V and each of QD1 to QD4 was about 1.0 Ah.

Each of $\Delta VD5_{max}$ to $\Delta VD8_{max}$ was about 0.05V and each of QD5 to QD8 was about 1.1 Ah.

Each of $\Delta VD9_{max}$ and $\Delta VD10_{max}$ was about 0.14V and each of QD9 and QD10 was about 1.9 Ah.

(Selecting Process)

At step S2 (see FIG. 3), from the used secondary batteries 1 to 10 whose charge amount-voltage curve C during charging and charge amount-voltage curve D during discharging have been obtained, the batteries having similar curves C and similar curves D are selected to the number (five batteries in the first embodiment) required to constitute the battery pack 20. In other words, the batteries having similar voltages corresponding to a predetermined charge amount during charging and similar voltages corresponding to a predetermined charge amount during discharging to each other are selected from the batteries 1 to 10.

To be concrete, by comparison between each curve C of the batteries 1 to 10 and the reference curve CS and between each curve D of batteries 1 to 10 and the reference curve DS, the batteries having the curves C similarly different from the curve CS and the curves D similarly different from the curve DS were selected. In other words, from among the batteries 1 to 10, the batteries having voltages corresponding to a predetermined charge amount during charging similarly different from that of the initial reference secondary battery and voltages corresponding to a predetermined charge amount during discharging similarly different from that of the initial reference secondary battery were selected. In the first embodiment, for example, the batteries 1 to 4 and the battery 5 could be selected (see FIG. 4).

In the first embodiment, particularly, the batteries 1 to 5 are selected so that a difference in QC (hereinafter, also referred to as a largest difference in QC) between the batteries 1 to 4 having a highest QC and the battery 5 having a lowest QC among the selected batteries 1 to 5 falls within 10% (0.65 Ah) of the full charge capacity (=6.5 Ah) of the initial reference secondary battery. Specifically, the largest difference in QC was 0.2 Ah (=5.5−5.3), which was a value as small as about 3% of the full charge capacity (=6.5 Ah) of the initial reference secondary battery. Further, the batteries 1 to 5 are selected so that a difference in QD (hereinafter, also referred to as a largest difference in QD) between the battery 5 having a highest QD and the batteries 1 to 4 having a lowest QD among the selected batteries 1 to 5 falls within 10% (0.65 Ah) of the full charge capacity (=6.5 Ah) of the initial reference secondary battery. To be concrete, the largest difference in QD was 0.1 Ah (=1.1−1.0), which was a value as small as about 2% of the full charge capacity (=6.5 Ah) of the initial reference secondary battery.

As above, by selection of the batteries 1 to 5 that are less different in maximum-difference charge amount QC during charging and less different in maximum-difference charge amount QD, the batteries that are similar in battery voltage behavior in use (during charging and during discharging) can be selected appropriately. When the thus selected batteries 1 to 5 constitute the battery pack 20, the battery voltage difference between the used secondary batteries in use of the battery pack 20 can be reduced appropriately.

In the first embodiment, furthermore, the batteries 1 to 5 are selected so that a difference in $\Delta VC_{max}$ (hereinafter, also referred to as a largest difference in $\Delta VC_{max}$) between the battery 5 with a largest $\Delta VC_{max}$ and the batteries 1 to 4 with a smallest $\Delta VC_{max}$ among the selected batteries 1 to 5 falls within 50% of $\Delta VC5_{max}$ of the battery 5 having the largest $\Delta VC_{max}$. Specifically, the largest difference in $\Delta VC_{max}$ (=$\Delta VC5_{max}$−$\Delta VC1_{max}$) is 0.01V (=0.03−0.02), which is a value as small as about 33% of $\Delta VC5_{max}$ (=0.03V).

Furthermore, the batteries 1 to 5 are selected so that a difference in $\Delta VD_{max}$ (hereinafter, also referred to as a largest difference in $\Delta VD_{max}$) between the battery 5 with a highest $\Delta VD_{max}$ and the batteries 1 to 4 with a lowest $\Delta VD_{max}$ among the selected batteries 1 to 5 falls within 50% of $\Delta VD5_{max}$ of the battery 5 having the highest $\Delta VD_{max}$. Specifically, the largest difference in $\Delta VD_{max}$ (=$\Delta VD5_{max}$−$\Delta VD1_{max}$) is 0.01V (=0.05−0.04), which is a value as small as 20% of $\Delta VC5_{max}$ (=0.05V).

As above, by selection of the batteries 1 to 5 that are less different in QC and QD and also less different in $\Delta VC_{max}$ and in $\Delta VD_{max}$, the batteries that are similar in battery voltage behavior in use (during charging and during discharging) can be selected more appropriately. When the thus selected batteries 1 to 5 constitute the battery pack 20, the battery voltage difference between the used secondary batteries in use of the battery pack 20 can be more reduced. This makes it possible to sufficiently exhibit the performance of each secondary battery constituting the battery pack 20.

In the first embodiment, this step S2 corresponds to the selecting process.

(Assembling Process)

At step S3, successively, as shown in FIG. 2, the used secondary batteries 1 to 5 were electrically connected in series in the numerical sequence by using connection members 11 having electric conductivity. Specifically, the connections were respectively established by means of the connection members 11 between a negative electrode terminal 1c of the battery 1 and a positive electrode terminal 2b of the battery 2; between a negative electrode terminal 2c of the battery 2 and a positive electrode terminal 3b of the battery 3; between a negative electrode terminal 3c of the battery 3 and a positive electrode terminal 4b of the battery 4; and between a negative electrode terminal 4c of the battery 4 and a positive electrode terminal 5b of the battery 5. Thus, the battery pack 20 of the first embodiment was produced.

In the first embodiment, the step S3 corresponds to the assembling process.

This battery pack 20 was combined with the battery controller 30 to produce the controller-equipped battery pack 50 (see FIG. 1).

As a first comparative example, a battery pack 320 (see FIG. 2) was produced by combining the batteries 6 to 10.

In this first comparative example, the largest difference in QC between the selected batteries 6 to 10 exceeds 10% of the full charge capacity (=6.5 Ah) of the initial reference secondary battery (see FIG. 4). Specifically, the largest difference in QC is 0.8 Ah (=5.3−4.5), which is a value as large as about 12% of the full charge capacity (=6.5 Ah) of the initial reference secondary battery. Further, the largest difference in QD between the selected batteries 6 to 10 exceeds 10% of the full charge capacity (=6.5 Ah) of the initial reference secondary battery. Concretely, the largest difference in QD is 0.8 Ah (=1.9−1.1), which is a value as large as about 12% of the full charge capacity (=6.5 Ah) of the initial reference secondary battery.

In the first comparative example, additionally, the largest difference in $\Delta VC_{max}$ between the selected batteries 6 to 10 exceeds 50% of $\Delta VC9_{max}$ of the battery 9 having the largest $\Delta VC_{max}$. To be more specific, the largest difference in $\Delta VC_{max}$ (=$\Delta VC9_{max}-\Delta VC6_{max}$) is 0.05V (=0.08−0.03), which is a value as large as about 63% of $\Delta VC9_{max}$ (=0.08V). Furthermore, the largest difference in $\Delta VD_{max}$ between the selected batteries 6 to 10 exceeds 50% of $\Delta VC9_{max}$ of the battery 9 having the maximum $\Delta VD_{max}$. Concretely, the largest difference in $\Delta VD_{max}$ (=$\Delta VD9_{max}-\Delta VD6_{max}$) is 0.09V (=0.14−0.05), which is a value as large as about 64% of $\Delta VC9_{max}$ (=0.14V).

Such battery pack 320 was combined with the battery controller 30 to produce a controller-equipped battery pack of the first comparative example.

Here, an explanation is given by comparison to charging/discharging control of the battery pack 20 of the first embodiment and charging/discharging control of the battery pack 320 of the first comparative example.

Figure 5:
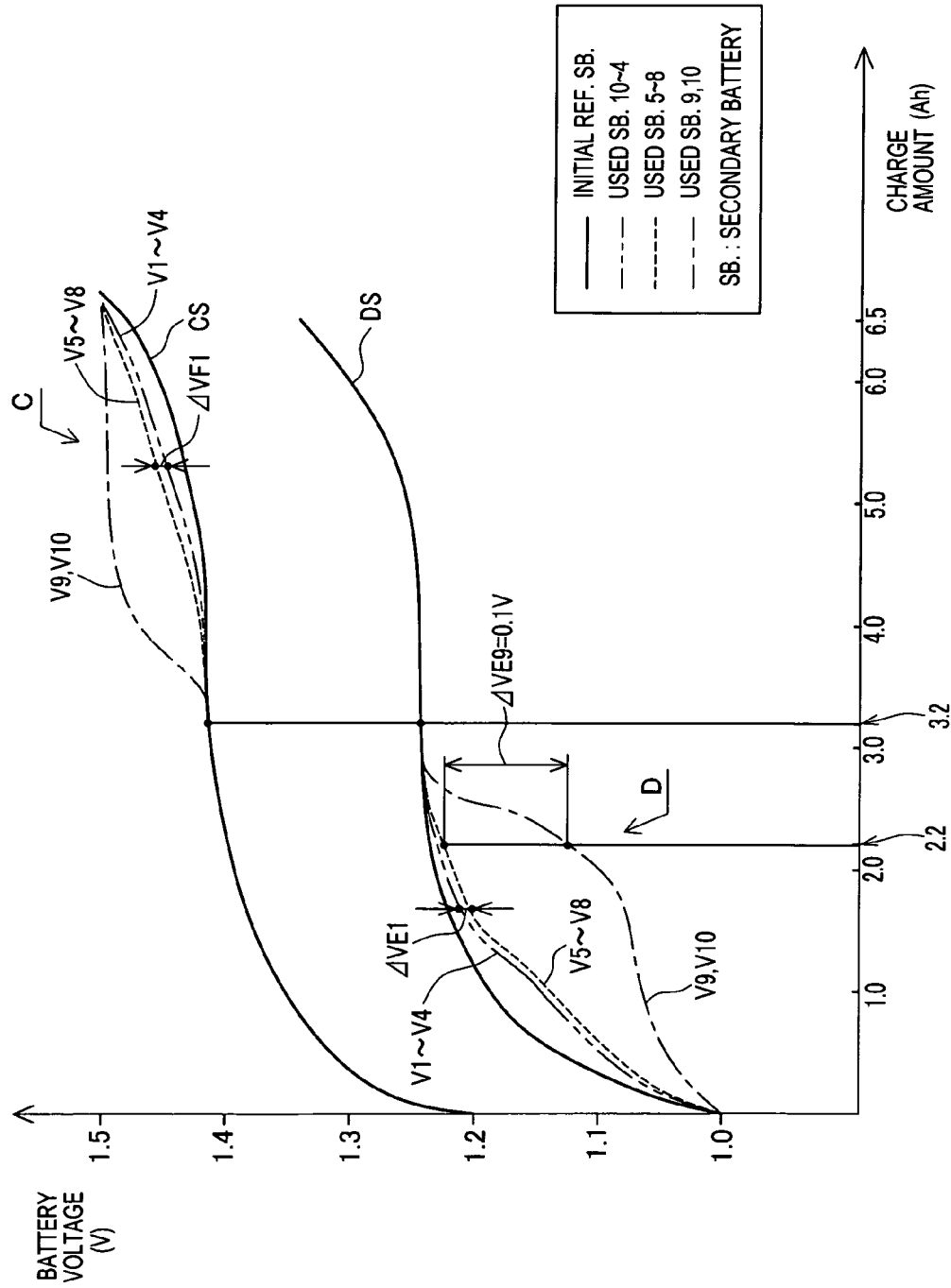
FIG. 5 is a graph showing a charge amount-voltage curve during charging and a charge amount-voltage curve during discharging of the used secondary batteries.
Figure 6:
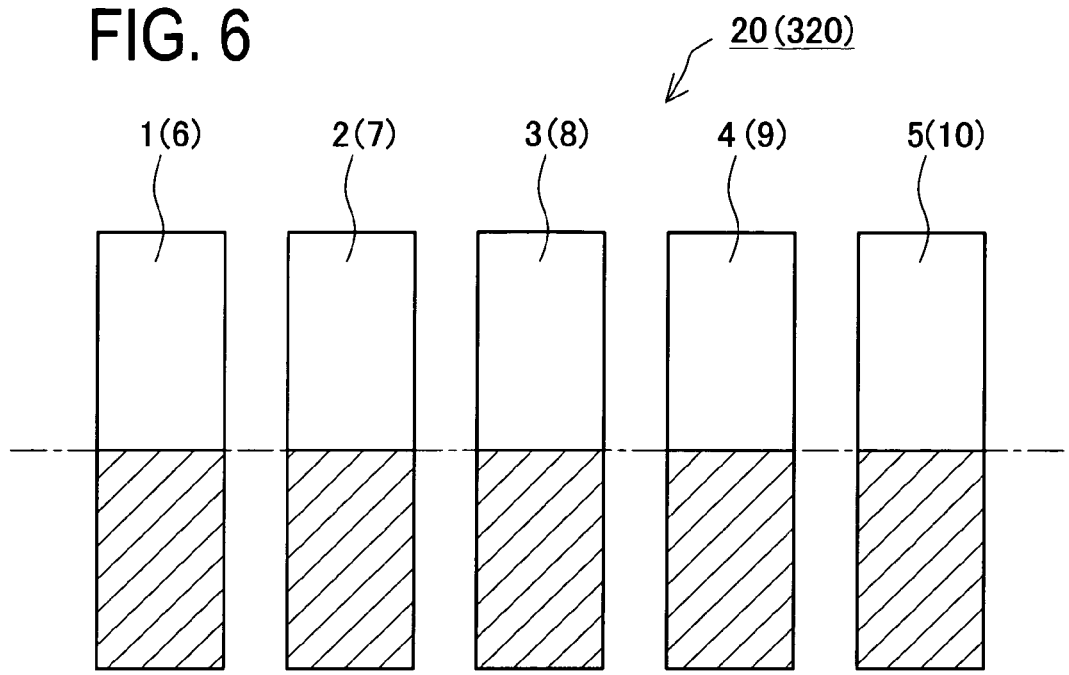
FIG. 6 is a schematic diagram showing a charged state of each used secondary battery constituting the battery pack, with a charge amount of about 3.2 Ah.

In the first embodiment, as shown in FIG. 6, the control reference of each battery 1 to 5 is a state with a charge amount of about 3.2 Ah. At that time, battery voltages V1 to V5 of the batteries 1 to 5 are equal to each other (see FIG. 5).

In the first comparative example, similarly as shown in FIG. 6, the control reference of each battery 6 to 10 is a state with a charge amount of about 3.2 Ah. At that time, battery voltages V6 to V10 are equal to each other (see FIG. 5).

In FIGS. 6 to 15, the full charge capacity of each of used secondary battery 1 to 10 is indicated by the length of a rectangular bar, and each charge amount or each estimated SOC is shown by hatching.

When a discharge command is issued from a control unit 70 (see FIG. 1) that performs various controls of the electric vehicle or the like, discharging of the battery pack 20 is started. In the battery pack 20 of the first embodiment in which the used secondary batteries 1 to 5 are electrically connected in series, those batteries 1 to 5 are discharged respectively by an equal electric quantity.

At this time, the battery controller 30 detects, at predetermined time intervals, the battery voltages V1 to V5 of the batteries 1 to 5 constituting the battery pack 20 as shown in FIG. 1. It is then determined whether or not the largest difference $\Delta VE1$ between a lowest battery voltage and a highest battery voltage of the battery voltages V1 to V5 exceeds a permissible range (0.1V). In the battery pack 20 of the first embodiment, as shown by the charge amount-voltage curve D during discharging in FIG. 5, the largest difference $\Delta VE1$ does not exceed the permissible range (0.1V) at any charge amount (Ah) during discharging. Thus, an abnormality in battery voltage is not detected.

In the battery pack 20 of the first embodiment, as shown in the charge amount-voltage curve C during charging in FIG. 5, the largest difference $\Delta VF1$ does not exceed the permissible range (0.1V) at any charge amount (Ah) during charging. Thus, an abnormality in battery voltage is not detected.

In the first embodiment, as mentioned above, any abnormality in battery voltage is not detected during use of the battery pack 20 (during charging and during discharging) and hence the battery pack 20 can be charged/discharged appropriately. In the first embodiment, accordingly, the performance of each secondary battery constituting the battery pack 20 can be sufficiently exhibited.

In the first comparative example, on the other hand, when discharging is started from the control reference state (the charged state of each battery with a charge amount of about 3.2 Ah), the largest difference $\Delta VE9$ between the lowest battery voltages V9 and V10 and the highest battery voltages V6 to V8 among the battery voltages V6 to V10 widens rapidly as shown by the charge amount-voltage curve D during discharging in FIG. 5. When the charge amount of each battery 6 to 10 becomes smaller than about 2.2 Ah, the largest difference $\Delta VE9$ exceeds the permissible range (0.1V). At that time, the battery controller 30 detects an abnormality in battery voltage and forcibly stops discharging of the battery pack 20. In the first comparative example, even though an electric quantity of about 2.2 Ah still remains in each battery 6 to 10 constituting the battery pack 320, discharging of the battery pack 320 is disabled. Thus, the performance of each secondary battery constituting the battery pack 320 cannot be exhibited sufficiently.

Embodiment 2

A battery pack equipped with a controller ("controller-equipped battery pack") 150 in a second embodiment is similar to the controller-equipped battery pack 50 in the first embodiment, except that a battery controller 130 is provided instead of the battery controller 30. The battery controller 30 and the battery controller 130 are different in only respective processing programs (not shown) installed in the battery controllers.

Specifically, the battery controller 130 of the second embodiment is configured to detect battery voltages V1 to V5, battery temperatures T1 to T5, current values I, and others of the batteries 1 to 5 constituting the battery pack 20. Based on those values, the SOC (State of Charge) of each of the batteries 1 to 5 is estimated.

When the estimated SOC value of any of the batteries 1 to 5 comes down to 10% during discharging, the discharging of the battery pack 20 is forcibly stopped. When the estimated SOC value of any of the batteries 1 to 5 reaches 90% during charging, the charging of the battery pack 20 is forcibly stopped. In this way, overcharging and overdischarging of the battery pack 20 can be prevented.

As a second comparative example, the battery controller 130 was combined with the battery pack 320 of the first comparative example 1 to produce a controller-equipped battery pack.

Here, an explanation is given by comparison to charging/discharging control of the battery pack 20 of the second embodiment and charging/discharging control of the battery pack 320 of the second comparative example.

Figure 7:
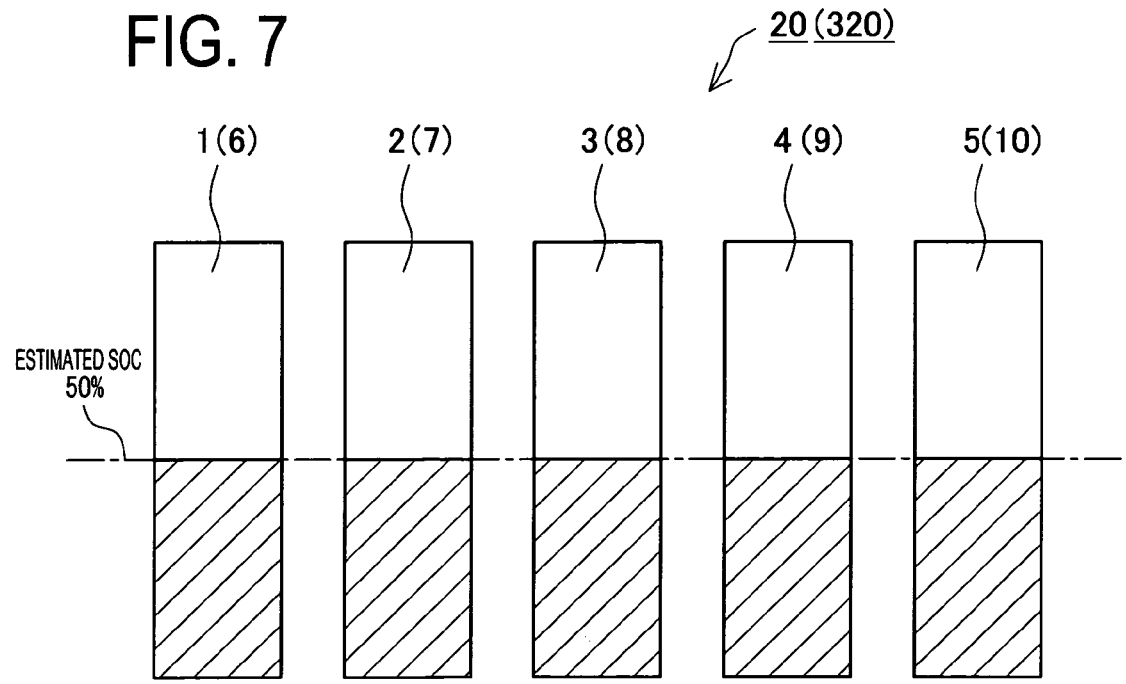
FIG. 7 is a schematic diagram showing an estimated SOC of each used secondary battery shown in FIG. 6 estimated by a battery controller.

In the second embodiment, the control reference of each battery 1 to 5 is a state with an estimated SOC of 50% (see FIG. 7). At that time, each battery 1 to 5 is in a charged state with a charge amount of about 3.2 Ah as shown in FIG. 6. The same applies to the second comparative example.

In the second embodiment, for example, when a discharge command is issued from the controller unit 70 (see FIG. 1) that performs various controls of the electric vehicle or the like, discharging of the battery pack 20 is started. In the battery pack 20 of the second embodiment in which the used secondary batteries 1 to 5 are electrically connected in series, those batteries 1 to 5 are discharged respectively by an equal electric quantity. At this time, the battery controller 130 estimates the SOCs of the batteries 1 to 5 and determines whether or not the SOC of any of the batteries 1 to 5 comes down to 10%.

Meanwhile, as mentioned above, the battery controller 130 calculates respective estimated SOCs based on the battery voltages of the batteries 1 to 5. Accordingly, even when real charge amounts of the batteries constituting the battery pack are made equal, the estimated SOCs will vary from battery to battery if the battery voltages of the batteries are different. During discharging, for example, if a used secondary battery whose battery voltage is likely to extremely decrease as compared with other batteries is included, an available electric quantity of the battery pack is liable to be largely restricted by the battery with small battery voltage. To be more specific, even when the charge amount of each used secondary battery is widely larger than an electric quantity corresponding to a SOC 10%, the discharging is forcibly stopped at the time when the estimated SOC of the battery having a lowest estimated SOC comes down to 10%. At that time, the electric power stored in the battery pack cannot be used any more.

In the second embodiment, on the other hand, the battery pack 20 is constituted by the used secondary batteries 1 to 5 having similar charge amount-voltage curves D during discharging as mentioned above (see FIG. 4). For details, the batteries are selected so that the largest difference in QC is within 10% (specifically, about 3%) of the full charge capacity of the initial reference secondary battery and the largest difference in QD is within 10% (specifically, about 2%) of the full charge capacity of the initial reference secondary battery. Further, the largest difference in $\Delta VC_{max}$ is within 50% (concretely, about 33%) of $\Delta VC5_{max}$ of the battery 5 having the largest $\Delta VC_{max}$ and the largest difference in $\Delta VD_{max}$ is within 50% (concretely, about 20%) of $\Delta VD5_{max}$ of the battery 5 having the largest $\Delta VC_{max}$. Those batteries 1 to 5 of the battery pack 20 will be similar in battery voltage behavior during discharging. Accordingly, in the second embodiment, the difference in battery voltage between the batteries 1 to 5 of the battery pack 20 during discharging can be reduced.

Figure 9:
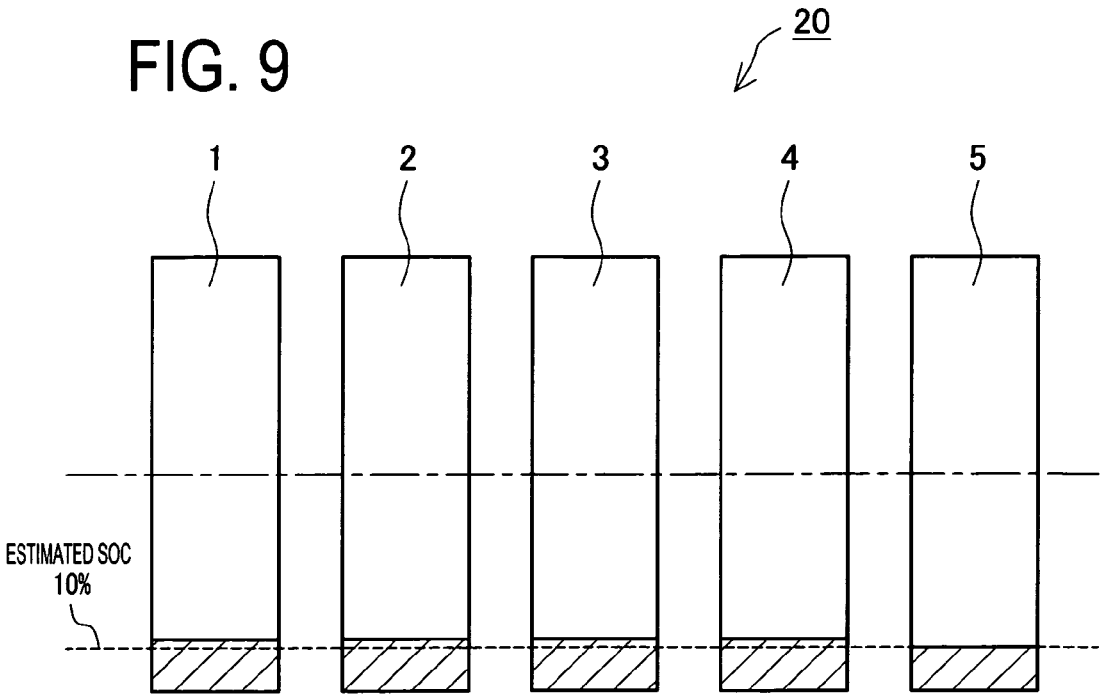
FIG. 9 is a schematic diagram showing an estimated SOC of each used secondary battery in the charged state as shown in FIG. 8, estimated by the battery controller.

To be more concrete, for instance, when the battery pack 20 is discharged from the charged state (a charge amount of each battery 1 to 5 is about 3.2 Ah) shown in FIG. 6, respective battery voltages V1 to V5 of the batteries 1 to 5 constituting the battery pack 20 decrease as shown by the curves D in FIG. 5. At that time, the battery voltage V5 of the battery 5 becomes slightly lower than the battery voltages V1 to V4 of the other batteries 1 to 4. Accordingly, the estimated SOC of the battery 5 comes down to 10% earlier than the estimated SOCs of the other batteries 1 to 4 as shown in FIG. 9, and the discharging of the battery pack 20 is forcibly stopped.

Figure 8:
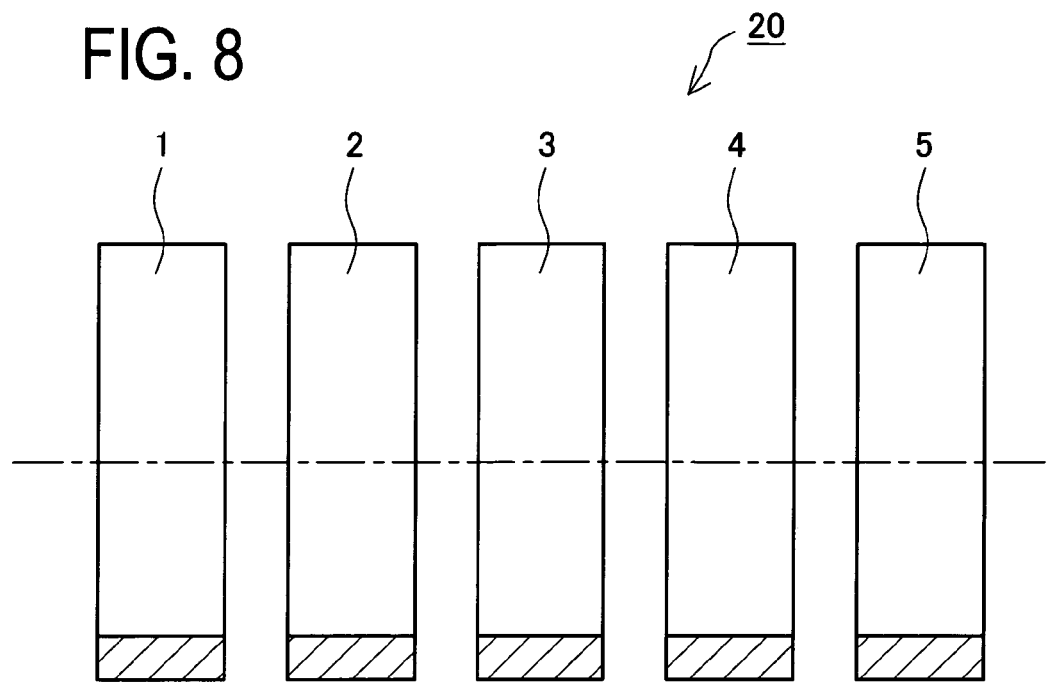
FIG. 8 is a schematic diagram showing a charged state of each used secondary battery of the battery pack discharged to a charge amount of about 0.7 Ah.

In the second embodiment, however, the battery voltage difference ΔVE1 between the battery 5 and the other batteries 1 to 4 during discharging is slight as shown by the curves D in FIG. 5, and a difference in estimated SOC is also slight. When the estimated SOC of the battery 5 comes down to 10%, accordingly, the estimated SOC of each battery 1 to 4 also comes close to 10% as shown in FIG. 9. The charge amounts of the batteries 1 to 5 at that time fall to about 0.7 Ah as shown in FIG. 8. Thus, an electric quantity of about 2.5 Ah could be used from the charged state (a charge amount of each battery 1 to 5 is about 3.2 Ah) shown in FIG. 6.

Figure 12:
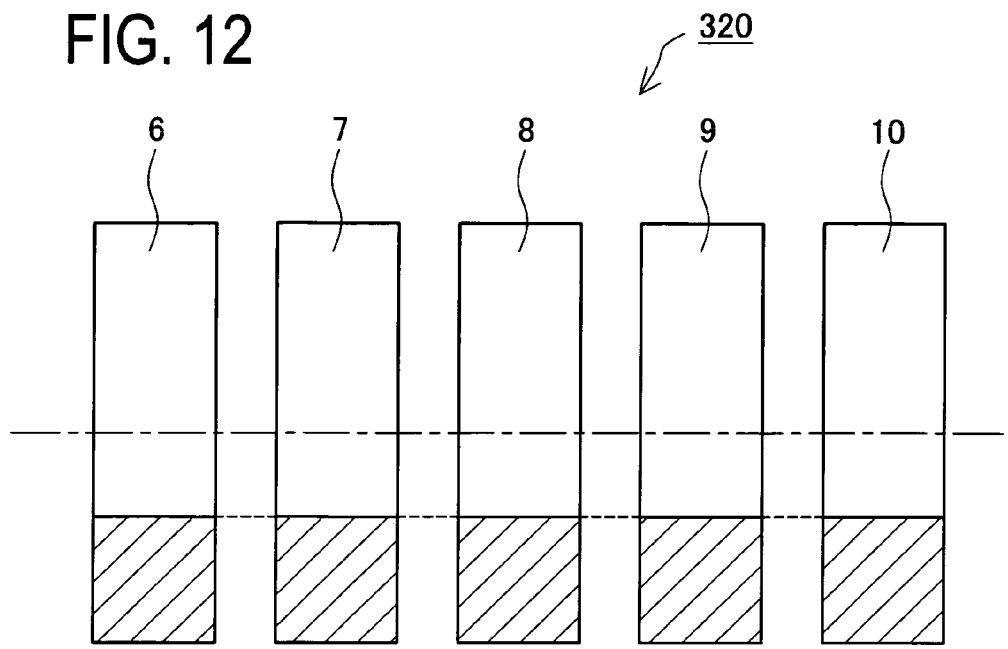
FIG. 12 is a schematic diagram showing a charged state of each used secondary battery of a battery pack in Comparative example 1 discharged to a charge amount of about 2.0 Ah.
Figure 13:
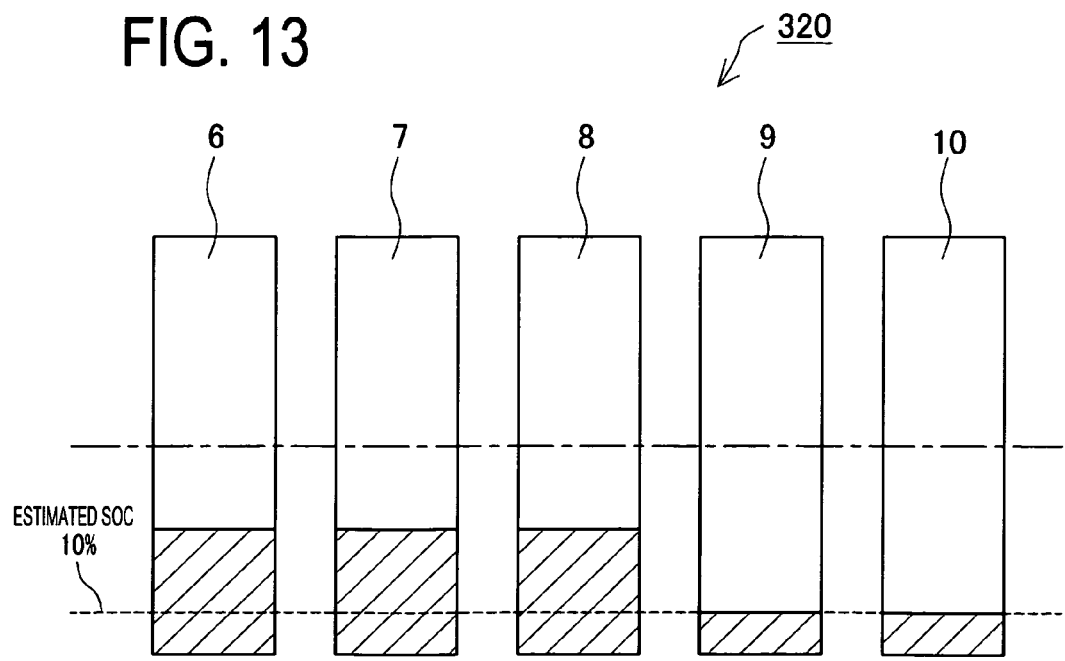
FIG. 13 is a schematic diagram showing an estimated SOC of each used secondary battery in the charged state as shown in FIG. 12, estimated by the battery controller.

On the other hand, the battery pack 320 of the second comparative example is discharged from the charged state (a charge amount of each battery 6 to 10 is about 3.2 Ah) shown in FIG. 6. Then, even though the estimated SOC of each battery 6 to 8 is widely larger than 10% (the estimated SOC: about 30%), the estimated SOC of each battery 9 and 10 comes down to 10%, and the discharging of the battery pack 320 is forcibly stopped as shown in FIG. 13. At that time, a charge amount of as much as about 2.0 Ah still remains in each battery 6 to 10 as shown in FIG. 12. Thus, only an electric quantity of about 1.2 Ah could not be used from the charged state (a charge amount of each battery 1 to 5 is about 3.2 Ah) shown in FIG. 6. In the second comparative example, as above, available electric quantity of the battery pack is liable to be largely restricted as compared with the embodiment 2.

This is because, of the batteries 6 to 10 constituting the battery pack 320 in the second comparative example, the charge amount-voltage curve D during discharging of each battery 9 and 10 is largely different from the charge amount-voltage curve D during discharging of each battery 6 to 8 (see FIG. 4). For details, the largest difference in QC between the batteries 6 to 10 exceeds 10% (concretely, about 12%) of the full charge capacity of the initial reference secondary battery and the largest difference in QD also exceeds 10% (concretely, about 12%) of the full charge capacity of the initial reference secondary battery. Another reason for the above disadvantage is that the largest difference in $\Delta VC_{max}$ exceeds 50% (specifically, about 63%) of $\Delta VC9_{max}$ of the battery 9 having the largest $\Delta VC_{max}$ and the largest difference in $\Delta VD_{max}$ also exceeds 50% (specifically, about 64%) of $\Delta VD9_{max}$ of the battery 9 having the largest $\Delta VD_{max}$.

Figure 11:
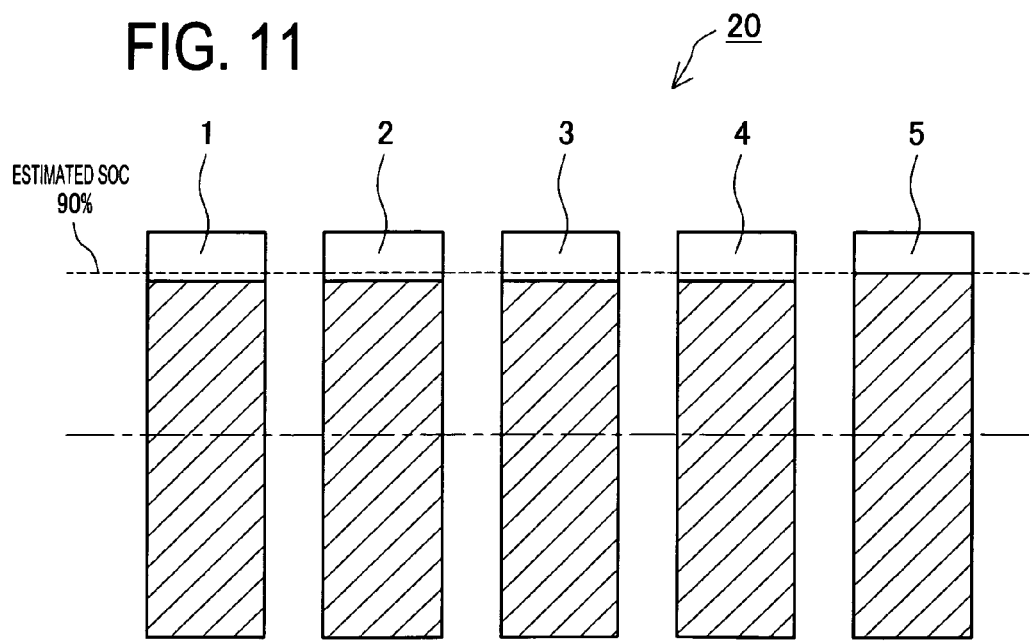
FIG. 11 is a schematic diagram showing an estimated SOC of each used secondary battery in the charged state as shown in FIG. 10, estimated by the battery controller.

Further, when the battery pack 20 of the second embodiment is discharged from the charged state (a charge amount of each battery 1 to 5 is about 3.2 Ah) shown in FIG. 6, the battery voltages V1 to V5 of the batteries 1 to 5 constituting the battery pack 20 increase respectively as shown by the curves C in FIG. 5. At that time, the battery voltage V5 of the battery 5 becomes slightly higher than the battery voltages V1 to V4 of the other batteries 1 to 4. Accordingly, as shown in FIG. 11, the estimated SOC of the battery 5 reaches 90% earlier than the estimated SOCs of the other batteries 1 to 4, and thus the charging of the battery pack 20 is forcibly stopped.

Figure 10:
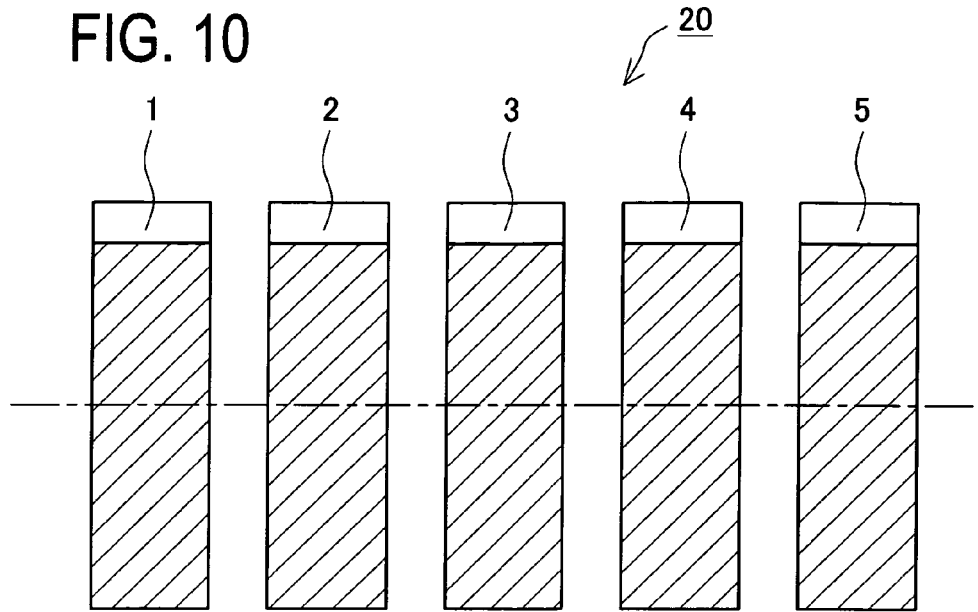
FIG. 10 is a schematic diagram showing a charged state of each used secondary battery of the battery pack charged to a charge amount of about 5.8 Ah.

In the second embodiment, however, the battery voltage difference ΔVF1 between the battery 5 and the other batteries 1 to 4 during charging is slight as shown by the curves C in FIG. 5, and a difference in estimated SOC is also slight. When the estimated SOC of the battery 5 reaches 90%, accordingly, the estimated SOC of each battery 1 to 4 also approaches 90% as shown in FIG. 11. The charge amounts of the batteries 1 to 5 at that time rise to about 5.8 Ah as shown in FIG. 10. Thus, an electric quantity of about 2.6 Ah could be charged from the charged state (a charge amount of each battery 1 to 5 is about 3.2 Ah) shown in FIG. 6.

Figure 14:
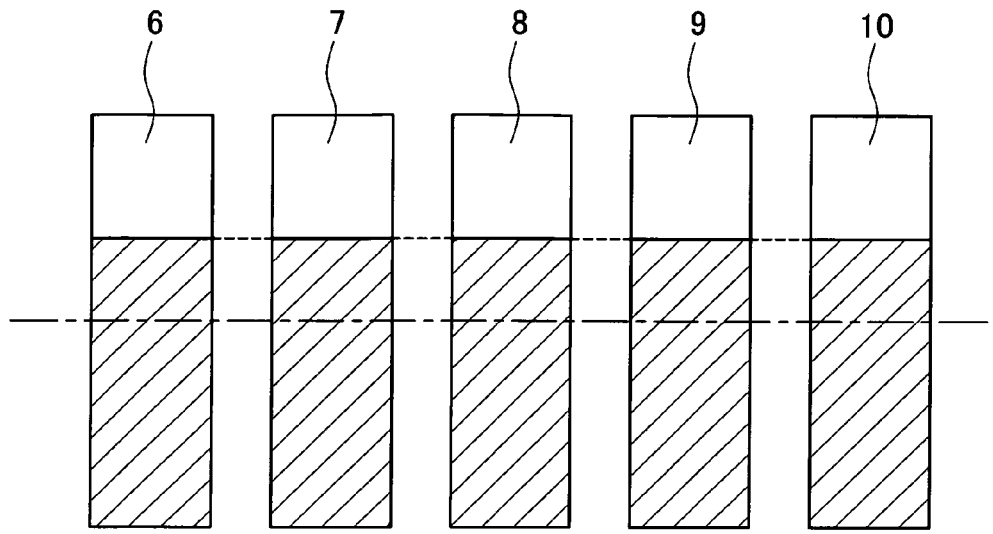
FIG. 14 is a schematic diagram showing a charged state of each used secondary battery of a battery pack in Comparative example 1 charged to a charge amount of about 4.5 Ah.
Figure 15:
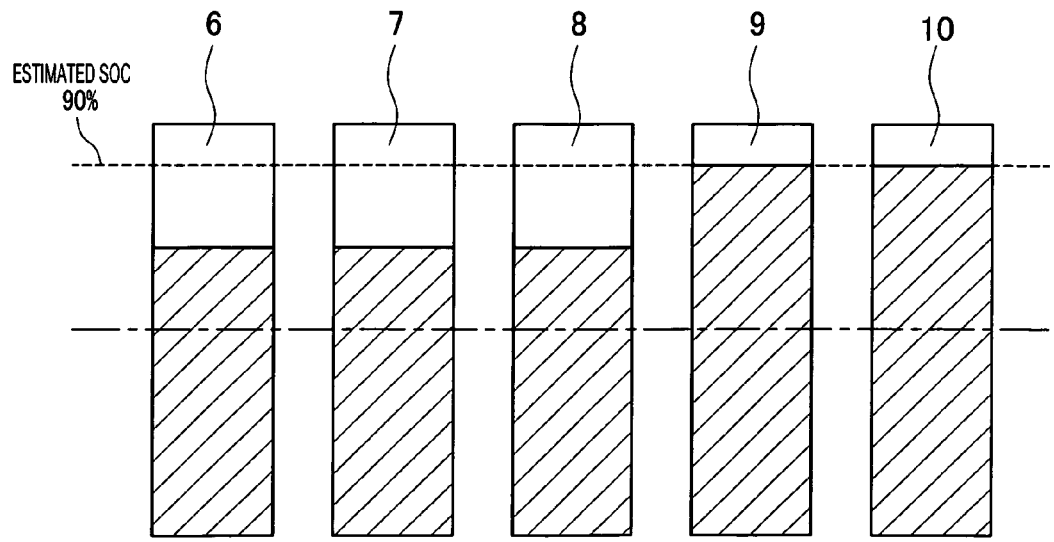
FIG. 15 is a schematic diagram showing an estimated SOC of each used secondary battery in the charged state as shown in FIG. 14 estimated by the battery controller.

On the other hand, the battery pack 320 of the second comparative example is charged from the charged state (a charge amount of each battery 6 to 10 is about 3.2 Ah) shown in FIG. 6. Then, even though the estimated SOC of each battery 6 to 8 is widely smaller than 90% (the estimated SOC: about 70%), as shown in FIG. 15, the estimated SOC of each battery 9 and 10 reaches 90%, and the charging of the battery pack 320 is forcibly stopped. At that time, a charge amount of each battery 6 to 10 is as small as about 4.5 Ah as shown in FIG. 14. Thus, only an electric quantity of about 1.3 Ah could not be charged from the charged state (a charge amount of each battery 1 to 5 is about 3.2 Ah) shown in FIG. 6. In the second comparative example, an available electric quantity of the battery pack is liable to be decreased as compared with the second embodiment.

From the above description, the battery pack 20 of the second embodiment can be said to be a battery pack capable of sufficiently exhibiting the performance of each used secondary battery constituting the battery pack. This is because the battery pack 20 is constituted by the used secondary batteries 1 to 5 having similar charge amount-voltage curves D during discharging as mentioned above (see FIG. 4). For details, the batteries are selected so that the largest difference in QC is within 10% (specifically, about 3%) of the full charge capacity of the initial reference secondary battery and the largest difference in QD is within 10% (specifically, about 2%) of the full charge capacity of the initial reference secondary battery. Further, the largest difference in $\Delta VC_{max}$ is within 50% (concretely, about 33%) of $\Delta VC5_{max}$ of the battery 5 that is largest in $\Delta VC_{max}$ among the batteries 1 to 5 and the largest difference in $\Delta VD_{max}$ is within 50% (concretely, about 20%) of $\Delta VD5_{max}$ of the battery 5 largest in $\Delta VC_{max}$.

The invention is described as above along the first and second embodiments but it is not limited thereto. The invention may be embodied in other specific forms without departing from the essential characteristics thereof.

For instance, the battery pack 20 in the first and second embodiments includes five used secondary batteries (the used secondary batteries 1 to 5). However, the used secondary batteries constituting the battery pack are not limited in number if only it is more than one.

In the first and second embodiments, regarding the used secondary batteries 1 to 10, respective voltages corresponding to a predetermined charge amount during charging are obtained. Based on them, the charge amount-voltage curve C during charging is created. Further, respective voltages corresponding to a predetermined charge amount during discharging are obtained and based on them the charge amount-voltage curve D during discharging is created. Instead of creating the charge amount-voltage curve C during charging and the charge amount-voltage curve D during discharging, the used secondary batteries for constituting the battery pack 20 may be selected based on the voltage corresponding to a predetermined charge amount during charging and the voltage corresponding to a predetermined charge amount during discharging of each battery.

In the first and second embodiments, the used secondary batteries 1 to 5 are electrically connected in series to constitute the battery pack 20. The present invention may also be applied to a battery pack constituted by a plurality of used secondary batteries electrically connected in parallel.

In the first and second embodiments, the used secondary batteries 1 to 5 are arranged in a row to form the battery pack. However, the used secondary batteries constituting the battery pack may be arranged in any pattern.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A battery pack producing method comprising:

an obtaining process for obtaining, about each of secondary batteries having ever been used, a charge amount-voltage curve during charging representing a relationship between a charge amount and a battery voltage when each used secondary battery is charged under a predetermined charge condition and a charge amount-voltage curve during discharging representing a relationship between a charge amount and a battery voltage when each used secondary battery is discharged under a predetermined discharge condition;

a selecting process for selecting more than one of the used secondary batteries having the charge amount-voltage curves during charging similar to each other and the charge amount-voltage curves during discharging similar to each other from a group of the used secondary batteries whose charge amount-voltage curves during charging and charge amount-voltage curves during discharging have been obtained;

an assembling process for combining and assembling the selected used secondary batteries into a new battery pack, the selecting process including selecting the used secondary batteries under condition that when a reference secondary battery exhibiting characteristics corresponding to a new secondary battery or an initial use stage has a charge amount-voltage reference curve during charging representing a relationship between a charge amount and a battery voltage when the reference secondary battery is charged under the predetermined charge condition and a charge amount-voltage reference curve during discharging representing a relationship between a charge amount and a battery voltage when the reference second battery is discharged under the predetermined discharge condition, when each of the used secondary batteries is defined such that:

of battery voltage differences during charging obtained by comparison in battery voltage at the same charge amount between the charge amount-voltage curve during charging and the charge amount-voltage reference curve during charging, a largest one is a maximum battery voltage difference during charging and a charge amount corresponding to the maximum battery voltage difference during charging is a maximum-difference charge amount during charging; and of battery voltage differences during discharging obtained by comparison in battery voltage at the same charge amount between the charge amount-voltage curve during discharging and the charge amount-voltage reference curve during discharging, a largest one is a maximum battery voltage difference during discharging and a charge amount corresponding to the maximum battery voltage difference during discharging is a maximum-difference charge amount during discharging, a difference between a largest one and a smallest one of the maximum-difference charge amounts during charging of the selected used secondary batteries falls within 10% of a full charge capacity of the initial reference battery, a difference between a largest one and a smallest one of the maximum-difference charge amounts during discharging of the selected used secondary batteries falls within 10% of a full charge capacity of the initial reference battery, a difference in the maximum battery voltage difference during charging between a largest one and a smallest one of the maximum battery voltage differences during charging of the used secondary batteries falls within 50% of the largest maximum battery voltage difference during charging, and a difference in the maximum battery voltage difference during discharging between a largest one and a smallest one of the maximum battery voltage differences during discharging of the used secondary batteries falls within 50% of the largest maximum battery voltage difference during discharging.

2. A battery pack producing method comprising:

an obtaining process for obtaining, about each of secondary batteries having ever been used, voltage corresponding to a predetermined charge amount during charging which is a battery voltage corresponding to each of a plurality of predetermined charge amounts of each used secondary battery when charged under a predetermined charge condition and voltage corresponding to a predetermined charge amount during discharging which is a battery voltage corresponding to each of a plurality of predetermined charge amounts of each used secondary battery when discharged under a predetermined discharge condition;

a selecting process for selecting more than one of the used secondary batteries having the voltages corresponding to a predetermined charge amount during charging similar to each other and the voltages corresponding to a predetermined charge amount during discharging similar to each other from a group of the used secondary batteries whose voltages corresponding to a predetermined charge amount during charging and voltages corresponding to a predetermined charge amount during discharging have been obtained;

an assembling process for combining and assembling the selected used secondary batteries into a new battery pack, the selecting process including selecting the used secondary batteries under condition that when a reference secondary battery exhibiting characteristics corresponding to a new secondary battery or an initial use stage has a reference voltage corresponding to a predetermined charge amount during charging when charged under the predetermined charge condition and a reference voltage corresponding to a predetermined charge amount during discharging when discharged under the predetermined discharge condition, when each of the used secondary batteries is defined such that:

of battery voltage differences during charging obtained by comparison between each voltage corresponding to the predetermined charge amount during charging and the reference voltage corresponding to the predetermined charge amount during charging at the same predetermined charge amount, a largest one is a maximum battery voltage difference during charging and a charge amount corresponding to the maximum battery voltage difference during charging is a maximum-difference charge amount during charging; and, of battery voltage differences during discharging obtained by comparison between each voltage corresponding to the predetermined charge amount during discharging and the reference voltage corresponding to the predetermined charge amount during discharging at the same predetermined charge amount, a largest one is a maximum battery voltage difference during discharging and a charge amount corresponding to the maximum battery voltage difference during discharging is a maximum-difference charge amount during discharging, a difference in maximum-difference charge amounts during charging between a largest one and a smallest one of the maximum-difference charge amounts during charging of the selected used secondary batteries falls within 10% of a full charge capacity of the initial reference battery, a difference in maximum-difference charge amounts during discharging between a largest one and a smallest one of the maximum-difference charge amounts during discharging of the selected used secondary batteries falls within 10% of a full charge capacity of the initial reference battery, a difference in the maximum battery voltage difference during charging between a largest one and a smallest one of the maximum battery voltage differences during charging of the used secondary batteries falls within 50% of the largest maximum battery voltage difference during charging, and a difference in the maximum battery voltage difference during discharging between a largest one and a smallest one of the maximum battery voltage differences during discharging of the used secondary batteries falls within 50% of the largest maximum battery voltage difference during discharging.

3. A battery pack including secondary batteries that have ever been used and are newly combined, wherein when each of the used secondary batteries is defined such that:

between a charge amount-voltage curve during charging representing a relationship between a charge amount and a battery voltage when each battery is charged under a predetermined charge condition and a charge amount-voltage reference curve during charging representing a relationship between a charge amount and a battery voltage when an initial reference secondary battery having characteristics corresponding to a new secondary battery or an initial use stage is charged under the predetermined charge condition, of battery voltage differences during charging obtained by comparison between the battery voltages at the same charge amount, a largest one is a maximum battery voltage difference during charging and a charge amount corresponding to the maximum battery voltage difference during charging is a maximum-difference charge amount during charging; and, between a charge amount-voltage curve during discharging representing a relationship between a charge amount and a battery voltage when each battery is discharged under a predetermined discharge condition and a charge amount-voltage reference curve during discharging representing a relationship between a charge amount and a battery voltage when the initial reference secondary battery is discharged under the predetermined discharge condition, of battery voltage differences during discharging obtained by comparison between the battery voltages at the same charge amount, a largest one is a maximum battery voltage difference during discharging and a charge amount corresponding to the maximum battery voltage difference during discharging is a maximum-difference charge amount during discharging, a difference in maximum-difference charge amount during charging between a largest one and a smallest one of the maximum-difference charge amounts during charging of the selected used secondary batteries falls within 10% of a full charge capacity of the initial reference battery, a difference in maximum-difference charge amount during discharging between a largest one and a smallest one of the maximum-difference charge amounts during discharging of the selected used secondary batteries falls within 10% of a full charge capacity of the initial reference battery, and of the used secondary batteries constituting the battery pack, a difference in the maximum battery voltage difference during charging between a largest one and a smallest one of the maximum battery voltage differences during charging falls within 50% of the largest maximum battery voltage difference during charging, and a difference in the maximum battery voltage difference during discharging between a largest one and a smallest one of the maximum battery voltage differences during discharging falls within 50% of the largest maximum battery voltage difference during discharging.

4. A battery pack including secondary batteries that have ever been used and are newly combined, wherein when each of the used secondary batteries is defined such that:

between a voltage corresponding to a predetermined charge amount during charging which is a battery voltage corresponding to each of predetermined charge amounts of each used secondary battery when charged under a predetermined charge condition and a reference voltage corresponding to a predetermined charge amount during charging which is a battery voltage corresponding to a predetermined charge amount of an initial reference secondary battery having characteristics corresponding to a new secondary battery or an initial use stage when it is charged under the predetermined charge condition, of battery voltage differences during charging obtained by comparison between the battery voltages at the same charge amount, a largest one is a maximum battery voltage difference during charging and a charge amount corresponding to the maximum battery voltage difference during charging is a maximum-difference charge amount during charging; and between voltage corresponding to a predetermined charge amount during discharging which is a battery voltage corresponding to each of predetermined charge amounts of each used secondary battery when discharged under a predetermined discharge condition and a reference voltage corresponding to a predetermined charge amount during discharging which is a battery voltage corresponding to each predetermined charge amount of the initial reference secondary battery when discharged under the predetermined charge condition, of battery voltage differences during discharging obtained by comparison between the battery voltages at the same charge amount, a largest one is a maximum battery voltage difference during discharging and a charge amount corresponding to the maximum battery voltage difference during discharging is a maximum-difference charge amount during discharging;

a difference in a maximum-difference charge amount during charging between a largest one and a smallest one of the maximum-difference charge amounts during charging of the selected used secondary batteries falls within 10% of a full charge capacity of the initial reference battery, a difference in maximum-difference charge amount during discharging between a largest one and a smallest one of the maximum-difference charge amounts during discharging of the selected used secondary batteries falls within 10% of a full charge capacity of the initial reference battery.

a difference in the maximum battery voltage difference during charging between a largest one and a smallest one of the maximum battery voltage differences during charging of the used secondary batteries falls within 50% of the largest maximum battery voltage difference during charging, and a difference in the maximum battery voltage difference during discharging between a largest one and a smallest one of the maximum battery voltage differences during discharging of the used secondary batteries falls within 50% of the largest maximum battery voltage difference during discharging.

* * * * *